(12) United States Patent
Li et al.

(10) Patent No.: US 11,783,523 B2
(45) Date of Patent: Oct. 10, 2023

(54) ANIMATION CONTROL METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Jingxiang Li, Shenzhen (CN); Xiaojun Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 312 days.

(21) Appl. No.: 17/193,525

(22) Filed: Mar. 5, 2021

(65) Prior Publication Data
US 2021/0192821 A1 Jun. 24, 2021

Related U.S. Application Data

(63) Continuation of application No. PCT/CN2019/114251, filed on Oct. 30, 2019.

(30) Foreign Application Priority Data

Dec. 5, 2018 (CN) .......................... 201811481911.5

(51) Int. Cl.
G06T 13/20 (2011.01)
G06T 3/40 (2006.01)
(Continued)

(52) U.S. Cl.
CPC ............ *G06T 13/20* (2013.01); *G06T 3/4007* (2013.01); *G06T 7/60* (2013.01); *G06T 19/20* (2013.01); *G06T 2219/2016* (2013.01)

(58) Field of Classification Search
CPC ......... G06T 13/20; G06T 3/4007; G06T 7/60; G06T 19/20; G06T 2219/2016
See application file for complete search history.

(56) References Cited

U.S. PATENT DOCUMENTS 9,791,897 B2 * 10/2017 Bear ...................... H04N 7/157
2011/0244956 A1 * 10/2011 Sakakibara ........... A63F 13/213
463/31
(Continued)

FOREIGN PATENT DOCUMENTS

CN 105488834 A * 4/2016 ............. G06T 13/40
CN 105488834 A 4/2016
(Continued)

OTHER PUBLICATIONS

The World Intellectual Property Organization (WIPO) International Search Report for PCT/CN2019/114251 dated Jan. 23, 2020 7 Pages (including translation).

Primary Examiner — Abderrahim Merouan
(74) Attorney, Agent, or Firm — ANOVA LAW GROUP, PLLC

(57) ABSTRACT

An animation control method and apparatus, a storage medium, and an electronic device are provided. The method includes: obtaining a first position of a virtual camera in an animation and a second position of a to-be-adjusted target in the animation; determining a first rotation angle of the to-be-adjusted target according to the first position, the second position, and coordinate information of a target object to which the to-be-adjusted target belongs; adjusting the first rotation angle by using a rotation coefficient to obtain a target angle, the rotation coefficient being used for adjusting a ratio of the first rotation angle of the to-be-adjusted target to a second rotation angle of an associated target, and the associated target having a linkage relationship (Continued)

with the to-be-adjusted target; and controlling the to-be-adjusted target to rotate according to the target angle.

20 Claims, 4 Drawing Sheets

(51) Int. Cl.
*G06T 7/60* (2017.01)
*G06T 19/20* (2011.01)

(56) References Cited

U.S. PATENT DOCUMENTS

| | | | |
|---|---|---|---|
| 2018/0160049 A1* | 6/2018 | Aizawa | H04N 23/69 |
| 2019/0370550 A1* | 12/2019 | Chen | G06T 7/70 |
| 2020/0330868 A1* | 10/2020 | Fan | A63F 13/65 |

FOREIGN PATENT DOCUMENTS

| | | |
|---|---|---|
| CN | 106042005 A | 10/2016 |
| CN | 106981099 A | 7/2017 |
| CN | 107463256 A | 12/2017 |
| CN | 108126343 A | 6/2018 |
| CN | 110163938 A | 8/2019 |
| JP | 2018099198 A | 6/2018 |

\* cited by examiner

ANIMATION CONTROL METHOD AND APPARATUS, STORAGE MEDIUM, AND ELECTRONIC DEVICE

CROSS-REFERENCES TO RELATED APPLICATIONS

This application is a continuation application of PCT Patent Application No. PCT/CN2019/114251, filed on Oct. 30, 2019, which claims priority to Chinese Patent Application No. 201811481911.5, entitled "ANIMATION CONTROL METHOD AND APPARATUS, STORAGE MEDIUM, AND ELECTRONIC DEVICE" filed with the China National Intellectual Property Administration, PRC on Dec. 5, 2018, the entire contents of both of which are incorporated herein by reference.

FIELD OF THE TECHNOLOGY

The present disclosure relates to the field of animation, and in particular, to animation control.

BACKGROUND OF THE DISCLOSURE

Most animations in a game are created by art designers by using digital content creation (DCC) software, (for example, Maya or 3dsMax) and then imported into a game engine for a state machine to switch in different animations. The advantage of the creation method is that the art designers can take creation advantage of the software to create lifelike animations. For a scenario in which eyeballs always face toward a camera, the art designers need to manually create animations in key orientations in the designing software, and animation interpolation is performed according to the key orientations when generating the animation. However, since the animations are produced in advance and need to cover all occurrences in the game, further considering animation jump issues when switching the state machines, the work load is huge for both the animation designers and game program developers.

Feedback of animation also needs to be made in time according to an input of a user to resolve the problem of real-time interaction. Therefore, an inverse kinematics (IK) animation based on that child bone nodes drive a parent bone node to move is also widely applied to game engines. The IK animation is to inversely derive movement of other bones according to a position of a bone at the end. For example, a hand is extended to catch a cup. The position of the cup is a target, and the IK animation resolves an animation from fingers to an arm. The IK animation can calculate the animation in real time without participation of the fine art. For the scenario in which the eyeballs always face toward the camera, once an orientation of the eyeballs is specified, an IK system automatically calculates orientations of the eyeballs, a head, and a neck. However, the IK animation does not allow fine art adjustments, such as manual adjustments configured by animation art designers for rotation angle ratio of two body parts (e.g., a neck and a head). In addition, many IK systems in game engines are developed by third-party, and using them involve copyright charges.

Apparently, both the state machine method and the IK method have their own flaws and inflexibility in animation control. The disclosed method and system are directed to solve one or more problems set forth above and other problems.

SUMMARY

Embodiments of the present disclosure provide an animation control method and apparatus, a storage medium, and an electronic device to resolve at least the technical problem of the inflexibility of animation control manners.

According to one aspect of the embodiments of the present disclosure, an animation control method is provided, applicable to an electronic device, the method including: obtaining a first position of a virtual camera in an animation and a second position of a to-be-adjusted target in the animation; determining a first rotation angle of the to-be-adjusted target according to the first position, the second position, and coordinate information of a target object to which the to-be-adjusted target belongs; adjusting the first rotation angle by using a rotation coefficient to obtain a target angle, the rotation coefficient being used for adjusting a ratio of the first rotation angle of the to-be-adjusted target to a second rotation angle of an associated target, and the associated target having a linkage relationship with the to-be-adjusted target; and controlling the to-be-adjusted target to rotate according to the target angle, so that the rotated to-be-adjusted target faces toward the virtual camera.

According to another aspect of the embodiments of the present disclosure, an animation control apparatus is further provided, applicable to an electronic device, including: a memory and a processor, the memory storing a computer program, and the processor. The processor is configured to perform, when executing the computer program, a plurality of operations including: obtaining a first position of a virtual camera in an animation and a second position of a to-be-adjusted target in the animation; determining a first rotation angle of the to-be-adjusted target according to the first position, the second position, and coordinate information of a target object to which the to-be-adjusted target belongs; adjusting the first rotation angle by using a rotation coefficient to obtain a target angle, the rotation coefficient being used for adjusting a ratio of the first rotation angle of the to-be-adjusted target to a second rotation angle of an associated target, and the associated target having a linkage relationship with the to-be-adjusted target; and controlling the to-be-adjusted target to rotate according to the target angle, so that the rotated to-be-adjusted target faces toward the virtual camera.

According to one aspect of the embodiments of the present disclosure, a non-transitory storage medium is further provided, storing a computer program. The computer program, when being executed by a processor, cause the processor to perform a plurality of operations including: obtaining a first position of a virtual camera in an animation and a second position of a to-be-adjusted target in the animation; determining a first rotation angle of the to-be-adjusted target according to the first position, the second position, and coordinate information of a target object to which the to-be-adjusted target belongs; adjusting the first rotation angle by using a rotation coefficient to obtain a target angle, the rotation coefficient being used for adjusting a ratio of the first rotation angle of the to-be-adjusted target to a second rotation angle of an associated target, and the associated target having a linkage relationship with the to-be-adjusted target; and controlling the to-be-adjusted target to rotate according to the target angle, so that the rotated to-be-adjusted target faces toward the virtual camera.

In the embodiments, according to positions of a to-be-adjusted target and a virtual camera, a matrix expression of coordinates of the to-be-adjusted target is determined. A rotation angle for the to-be-adjusted target is then determined according to the coordinates of the to-be-adjusted target. The rotation angle may be adjusted according to an inputted rotation coefficient to obtain a target angle. Next the to-be-adjusted target is controlled to adjust according to the target angle, to make the rotation of the to-be-adjusted target more flexible and the expressed effect more natural, thereby resolving the technical problem of inflexibility of rotation angle adjustment in the related art.

BRIEF DESCRIPTION OF THE DRAWINGS

The accompanying drawings described herein are used to provide a further understanding of the present disclosure, and form a part of the present disclosure. Exemplary embodiments of the present disclosure and descriptions thereof are used to explain the present disclosure, and do not constitute any inappropriate limitation to the present disclosure. In the drawings.

DESCRIPTION OF EMBODIMENTS

To make a person skilled in the art better understand solutions of the present disclosure, the technical solution in the embodiments of the present disclosure is clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The terms such as "first" and "second" in the specification, the claims, and the foregoing accompanying drawings of the present disclosure are intended to distinguish between similar objects, but are not necessarily used for describing a particular sequence or a chronological order. It is to be understood that the data termed in such a way are interchangeable in proper circumstances, so that the embodiments of the present disclosure described herein can be implemented in orders other than the order illustrated or described herein. Moreover, the terms "include", "comprise", and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
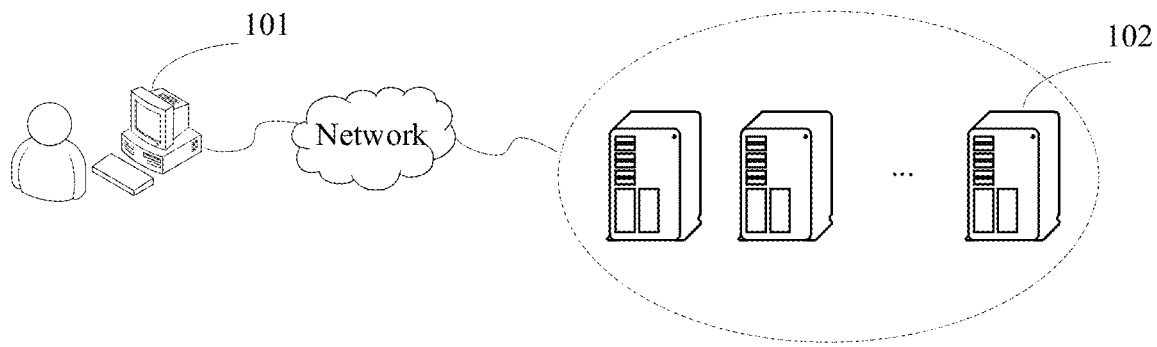
FIG. 1 is a schematic diagram of an exemplary hardware environment according to an embodiment of the present disclosure.

According to one aspect of the embodiments of the present disclosure, an animation control method is provided. In one embodiment, when the technical solution of the present disclosure is applied to a local application (for example, a stand-alone game), the animation control method may be applied to a hardware environment formed by a terminal 101 shown in FIG. 1. The terminal 101 adjusts an orientation of a to-be-adjusted target by performing the animation control method of the present disclosure.

Optionally, when the technical solution of the present disclosure is applied to an online application (for example, an online game), the foregoing hardware environment may further include a server 102 providing a business service (for example, a game service) to the terminal 101. The server 102 performs the animation control method of the present disclosure and provides a performing result as a part of the service (for example, the game service) to the terminal 101, to adjust an orientation of a to-be-adjusted target on the terminal. The terminal 101 may be connected to the server 102 through a network. The network includes, but is not limited to, a wide area network, a metropolitan area network, or a local area network. The terminal 101 may be a mobile phone terminal, a PC terminal, a notebook terminal, or a tablet computer terminal.

Scenes to which the technical solution of the present disclosure is applicable include, but are not limited to, the following scenes.

The technical solution of the present disclosure may be applicable to a social scene in which a technology such as augmented reality (AR) or virtual reality (VR) is used. The social scene may be provided by the foregoing terminal 101, and the server 102 synchronizes a social behavior in the social scene. The social scene includes a target object to which the to-be-adjusted target belongs. The target object may be an object such as a virtual character corresponding to a current user in the social scene, a virtual, a virtual friend of the current user in the social scene, a virtual stranger in the social scene, or a virtual pet of the current user in the social scene. When the target object moves in the social scene, the server may adjust an orientation of a to-be-adjusted target on the target object by performing the technical solution of the present disclosure, for example, adjusting eyes to always face toward a virtual camera, and deliver an adjustment result to each terminal, so that the each terminal synchronously renders a picture in which the eyes of the target object always face toward a screen (a picture played on the screen is the picture rendered in the perspective of the virtual camera).

The technical solution of the present disclosure may be further applicable to a game scene, for example, a multi-player online battle arena (MOBA) game, a first-person shooter (FPS) game, or a third-person shooter (TPS) game. An application of the foregoing game may be installed on the terminal 101 to form a client of the game. A player plays the game in the game scene by using the client. The game scene includes a target object to which a to-be-adjusted target belongs. The target object may be an object such as a game role operated by a current user in the game scene, a teammate of the game role, or an enemy of the game role. The to-be-adjusted target may be an organ of a character role or a part such as eyes of a body structure. When a player plays a game in a game scene, and if the game is a stand-alone game or a local multiplayer game, one terminal may adjust an orientation of a to-be-adjusted target on a target object by performing the technical solution of the present disclosure and synchronize a performing result to other terminals. If the game is an online game, the server 102 may adjust the orientation of the to-be-adjusted target on the target object by performing the technical solution of the present disclosure and synchronize a performing result to terminals participating in the game.

Figure 2:
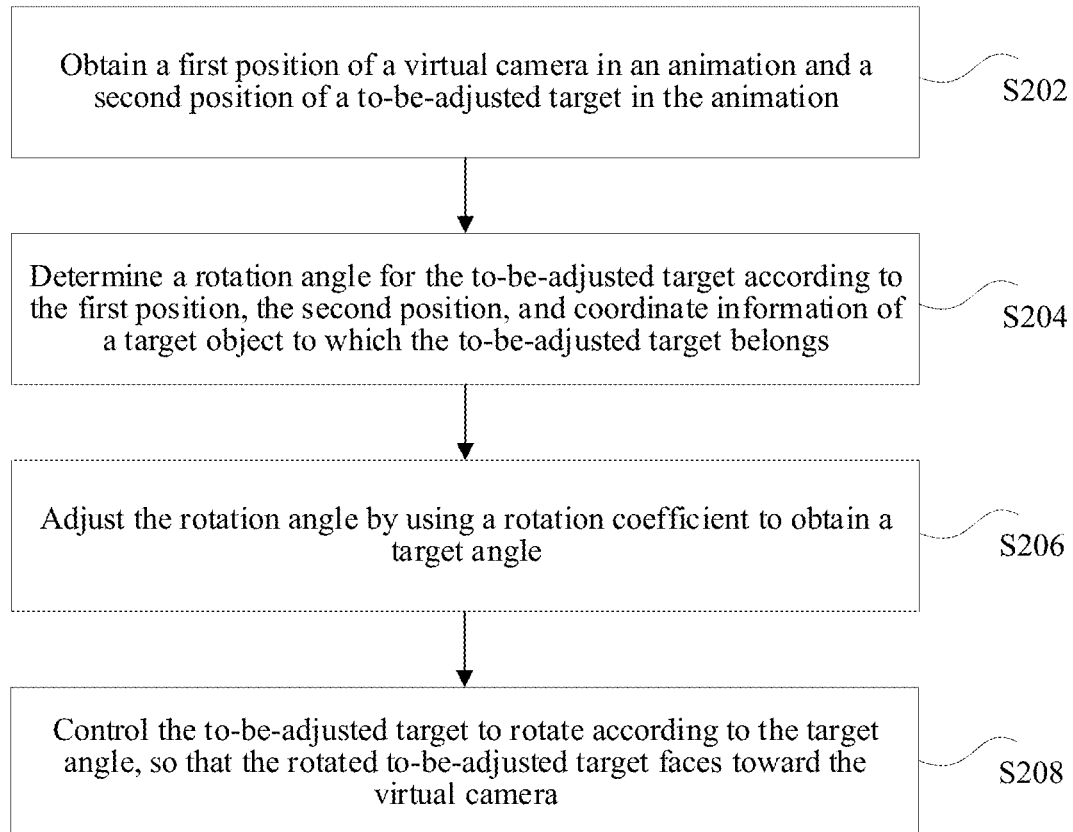
FIG. 2 is a flowchart of an exemplary animation control method according to an embodiment of the present disclosure.

An example in which the terminal 101 performs the animation control method in the embodiments of the present disclosure is used for description. The animation control method in the embodiments of the present disclosure performed by the terminal 101 may be alternatively performed by a client (for example, a client of a game application) installed thereon. For example, the animation control method in the present disclosure is embedded into a game engine of a game application as a part of the logic of the game engine; or the animation control method in the present disclosure is embedded into a game logic of a game application as a part of the game logic. FIG. 2 is a flowchart of an exemplary animation control method according to an embodiment of the present disclosure. As shown in FIG. 2, the animation control method includes the following steps.

S202. A terminal obtains a first position of a virtual camera in an animation and a second position of a to-be-adjusted target in the animation.

A plurality of objects may be expressed in the animation. The to-be-adjusted target may be a part of the object. The object may be a character role. The to-be-adjusted target may be an organ of the character role or a part such as eyes of a body structure. The animation may be a game animation. The to-be-adjusted target may be eyes of a game role. The first position is a position of the virtual camera in the animation. The second position is a position of the to-be-adjusted target in the animation. A game scene and each role in the game scene may be rendered by a game engine. During obtaining of the first position and the second position, the second position of the to-be-adjusted target in the animation rendered by the game engine may be obtained in the game engine, and the first position of the virtual camera may be obtained by using a configuration file (a state, a moving logic, and the like of each virtual camera are configured in the configuration file) of the game engine. Both the first position and the second position may be expressed by three-dimensional coordinates. The three-dimensional coordinates may be expressed by using a matrix.

S204. The terminal determines a rotation angle for the to-be-adjusted target according to the first position, the second position, and coordinate information of a target object to which the to-be-adjusted target belongs. The rotation angle for the to-be-adjusted target may be referred as the first rotation angle.

Figure 3:
FIG. 3 is a schematic diagram of an exemplary vector according to an embodiment of the present disclosure.

A vector heading from the second position to the first position is obtained (the vector may be a vector in a three-dimensional coordinate system). As shown in FIG. 3, an x-axis coordinate of the to-be-adjusted target is obtained by multiplying the vector by a matrix [0 0 1]; a y-axis coordinate of the to-be-adjusted target is obtained by multiplying the vector by a matrix [0 1 0]; and a z-axis coordinate of the to-be-adjusted target is obtained by multiplying the vector by a matrix [1 0 0]. Therefore, a matrix expression of the coordinates of the to-be-adjusted target in a three-dimensional space is obtained. The matrix is a rotation matrix $M_r$ (that is, a first matrix). To offset cases that a player controls rotation of a role when playing a game and the role is not aligned with an X-axis in an initial state, a rotation matrix $M_t$ (that is, a second matrix) of the role when the player controls the role to rotate and a rotation matrix $M_i$ (that is, a third matrix) of the role in the initial state are obtained. The rotation matrix $M_r$, the rotation matrix $M_t$, the rotation matrix $M_i$ are multiplied to obtain a target matrix $M$ of the to-be-adjusted target:

$$M = M_i * M_t^{-1} * M_r$$

where the target object to which the to-be-adjusted target belongs is a game role, the coordinate information of the target object includes the rotation matrix $M_t$ and the rotation matrix $M_i$, and the rotation matrix $M_t$ and the rotation matrix $M_i$ may be obtained by using the game engine.

Optionally, each of $M_i$, $M_t^{-1}$, $M_r$ is a 3×3 matrix. The rotation matrix $M_t$ represents a rotation matrix corresponding to the game role which is under control of the player and the control operation of the player (that is, a conversion matrix from a state before control to a state after control). The rotation matrix $M_t$ and the rotation matrix $M_i$ of the role in the initial state may be obtained through an application programming interface (API) provided by the game engine:

$$M_i = \begin{bmatrix} i_{11} & i_{12} & i_{13} \\ i_{21} & i_{22} & i_{23} \\ i_{31} & i_{32} & i_{33} \end{bmatrix},$$

where $i_{11}$ to $i_{33}$ are constants;

$$M_t = \begin{bmatrix} t_{11} & t_{12} & t_{13} \\ t_{21} & t_{22} & t_{23} \\ t_{31} & t_{32} & t_{33} \end{bmatrix},$$

where $t_{11}$ to $t_{33}$ are constants;

$$M_r = \begin{bmatrix} r_{11} & r_{12} & r_{13} \\ r_{21} & r_{22} & r_{23} \\ r_{31} & r_{32} & r_{33} \end{bmatrix},$$

where $r_{11}$ to $r_{33}$ are constants which are values calculated according to the vector from the second position to the first position; and $$M = M_i * M_t^{-1} * M_r = \begin{bmatrix} R_{11} & R_{12} & R_{13} \\ R_{21} & R_{22} & R_{23} \\ R_{31} & R_{32} & R_{33} \end{bmatrix},$$

where values from $R_{11}$ to $R_{33}$ may be directly calculated by using values of elements in $M_i$, $M_t^{-1}$, $M_r$.

That is, the determining a rotation angle for the to-be-adjusted target according to the first position, the second position, and coordinate information of a target object to which the to-be-adjusted target belongs includes: obtaining a first matrix of the to-be-adjusted target according to a vector from the second position to the first position; obtaining a rotation matrix of the target object as a second matrix, the second matrix being used to control rotation of the target object in a preset scene; obtaining a rotation matrix of the target object in an initial state as a third matrix; multiplying the first matrix, an inverse matrix of the second matrix, and the third matrix sequentially to obtain a target matrix; and converting the target matrix into the rotation angle.

The first matrix is the rotation matrix $M_r$, the second matrix is the rotation matrix $M_t$, and the third matrix is the rotation matrix $M_i$. After the target matrix is obtained, and because the target matrix cannot directly express the value of the rotation angle, for the convenience of adjusting the rotation angle for the to-be-adjusted target, the target matrix may be converted into a rotation angle by using the following formulas:

$$\omega_x = a\tan 2(R_{32}, R_{33});$$

$$\omega_y = a\tan 2(-R_{31}, \sqrt{(R_{32})^2 + (R_{33})^2}); \text{ and}$$

$$\omega_z = a\tan 2(R_{21}, R_{11}).$$

The rotation angle may include an angle $\omega_x$ relative to an X-axis, an angle $\omega_y$ relative to a Y-axis, and an angle $\omega_z$ relative to a Z-axis.

S206. The terminal adjusts the rotation angle by using a rotation coefficient to obtain a target angle.

After the to-be-adjusted target is rotated according to the target angle, the to-be-adjusted target faces toward to the virtual camera. Because the target angle represents an angle difference between an angle before the adjustment and an angle when the virtual camera is faced rightly, the to-be-adjusted target which is adjusted according to the target angle faces toward the virtual camera. The rotation coefficient is used for adjusting a ratio of the first rotation angle of the to-be-adjusted target to a second rotation angle of an associated target, and the associated target has a linkage relationship with the to-be-adjusted target. In an optional manner, the rotation coefficient is set by way of fine art animation.

For a role, rotation of a part of the role may cause linkage of other parts, or other related parts are rotated at the same time when a part is rotated, making a rotation effect more natural. Therefore, when the to-be-adjusted target is rotated, rotation angles of other associated targets need to be considered, that is, a ratio (that is, the foregoing rotation coefficient) of the rotation angle is set for the to-be-adjusted target and the associated targets. The rotation angle(s) of the associated target(s) may be referred as the second rotation angle(s).

Figure 4:
FIG. 4 is a schematic diagram of an exemplary rotation effect according to an embodiment of the present disclosure.

For example, the to-be-adjusted target is eyes of the role, the associated targets include a head and a neck of the role, and a rotation ratio of the eyes to the head to the neck is 3:2:1. M is obtained by substituting values of the elements in $M_i$, $M_t^{-1}$, $M_r$. Then in response to that it is determined that a target angle of the eyes is an angle obtained by subtracting 30° from an angle between the eyes and the X-axis, the head is rotated by 20° (that is, subtracting 20° from an angle between the head and the X-axis), and the neck is rotated by 10° (that is, subtracting 10° from an angle between the neck and the X-axis). In this example, the rotation coefficient of the to-be-rotated target may be 3, a rotation ratio of the to-be-rotated target to the head is 3:2, and a rotation ratio of the to-be-rotated target to the neck is 3:1. The rotation coefficient herein may be set according to different positions of the to-be-adjusted target in the object, to enable the to-be-adjusted target after being rotated according to the target angle to face toward the virtual camera and enable the object to move relatively natural. As shown in FIG. 4, the eyes are rotated by 30°, the head is rotated by 20°, and the neck is rotated by 10°.

Rotation manners of rotation angles relative to the Y-axis and Z-axis are similar to that of the rotation angle relative to the X-axis.

S208. The terminal controls the to-be-adjusted target to rotate according to the target angle, so that the rotated to-be-adjusted target faces toward the virtual camera.

In the embodiments, according to positions of a to-be-adjusted target and a virtual camera, a matrix expression of coordinates of the to-be-adjusted target is determined. Then a rotation angle of the to-be-adjusted target is determined according to the coordinates of the to-be-adjusted target. The rotation angle may be adjusted according to an inputted rotation coefficient to obtain a target angle. Next the to-be-adjusted target is controlled to adjust according to the target angle, to make the rotation of the to-be-adjusted target more flexible and the expressed effect more natural, thereby resolving the technical problem of inflexibility of rotation angle adjustment in the related art.

Optionally, the controlling the to-be-adjusted target to rotate according to the target angle includes: obtaining a current rotation matrix (the current rotation matrix is similar to the rotation matrix $M_t$ and rotation matrix $M_i$, and may be obtained through the API provided by the game engine) of the to-be-adjusted target, for a game role, the rotation including two parts: one being rotation of the entire game role under control of the player, the current rotation matrix being used for representing rotation of the entire role (e.g., the target object) at present; the other being rotation for enabling the to-be-adjusted target to always face toward the virtual camera and being represented by a target matrix or a target angle converted from a target matrix, and final rotation being obtained by superimposing the two parts; and applying the target angle to the current rotation matrix to obtain a target matrix, a rotation angle represented by the target matrix being an angle at which the to-be-adjusted target faces toward the virtual camera. In this case, the to-be-adjusted target is controlled to rotate to the target matrix, so that the to-be-adjusted target always faces toward the virtual camera.

In an optional example, the current rotation matrix represents a spatial position of the to-be-adjusted target before the rotation and may be represented by $M_e$:

$$M_e = \begin{bmatrix} e_{11} & e_{12} & e_{13} \\ e_{21} & e_{22} & e_{23} \\ e_{31} & e_{32} & e_{33} \end{bmatrix},$$

where $e_{11}$ to $e_{33}$ are constants.

$$M_a = [\omega_x, \omega_y, \text{ and } \omega_z].$$

The current rotation matrix is multiplied by the matrix $M_a$ representing the target angle, to rotate the to-be-adjusted target based on a product matrix of $M_e$ and $M_a$. When there is a requirement for the eyes to face toward the virtual camera, the to-be-adjusted target after the rotation faces toward the virtual camera. The requirement herein may refer to a requirement in the game at a specific moment for the to-be-adjusted target to face toward the virtual camera, or for the to-be-adjusted target to face toward the virtual camera in an entire game process. Once the to-be-adjusted target does not face toward the virtual camera in the process, adjustment is performed according to the foregoing method in the present disclosure. The effect after the adjustment is shown in FIG. 4.

Optionally, the animation control method provided in the embodiments of the present disclosure further includes: setting a time required for rotation of the to-be-adjusted target as rotation time; and performing linear interpolation on the rotation angle according to the rotation time to obtain an interpolated rotation angle, so that the interpolated rotation angle is adjusted by using the rotation coefficient to obtain the target angle, the target angle being obtained by multiplying the interpolated rotation angle by the rotation coefficient.

Duration of obtaining the "rotation time" is not limited in the embodiments of the present disclosure, and only needs to be completed before the "performing linear interpolation on the rotation angle according to the rotation time" is performed.

To naturalize the rotation effect and avoid the to-be-adjusted target rotating the target angle in an instant, before the rotation coefficient is inputted to adjust the rotation angle, one linear interpolation is performed on the rotation angle according to the time, that is, a time required for rotation is set, and may be adjusted by multiplying the interpolated rotation angle and the rotation coefficient. For example, in response to that the rotation angle is 30°, and if the rotation time is one second, the to-be-adjusted target is controlled to rotate by 30° in one second; and if the rotation time is five seconds, the to-be-adjusted target is controlled to rotate by 30° in five seconds. The linear interpolation only changes the time required for the rotation, but not change the angle of the rotation of the to-be-adjusted target. The rotation time is set to five seconds, so that the effect of slow rotation of the to-be-adjusted target may be expressed.

Optionally, the controlling the to-be-adjusted target to rotate according to the target angle includes: obtaining a rotation coefficient of at least one associated target as at least one rotation coefficient; applying the at least one rotation coefficient to a corresponding associated target among the associated targets to obtain at least one rotation angle; and controlling the at least one associated target and the to-be-adjusted target to rotate hierarchically according to the target angle and the at least one rotation angle.

After the rotation coefficients of the associated targets are determined, the rotation angles of the associated targets are determined. For example, the to-be-adjusted target is eyes of a role, the associated targets include a head and a neck of the role, and a rotation ratio of the eyes to the head to the neck is 3:2:1. In response to that it is determined that a target angle of the eyes is 30°, the head is rotated by 20°, and the neck is rotated by 10°. After the rotation angle of each part is determined, rotation is performed according to the hierarchy of bones, that is, rotation is performed in an order from the neck to the head to the eyes.

Figure 5:
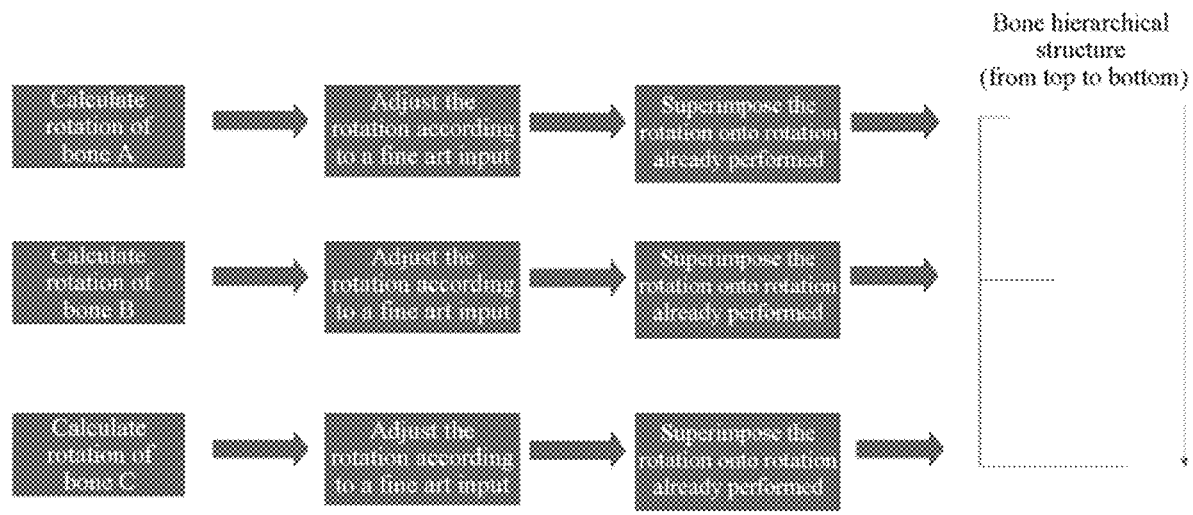
FIG. 5 is a schematic diagram of an exemplary rotation angle application according to an embodiment of the present disclosure.

As shown in FIG. 5, a bone A represents the neck, a bone B represents the head, and a bone C represents the eyes. The hierarchical order of the bones is from the bone A to the bone B to the bone C. A rotation angle of the bone A is calculated first, rotation is then adjusted according to a fine art input, that is, the rotation angle of the bone A is adjusted according to an inputted rotation coefficient, and the adjusted rotation is superimposed onto rotation already performed, that is, superimposed onto a current rotation angle of the bone A, to complete rotation of the bone A. A rotation angle of the bone B is calculated, rotation is then adjusted according to a fine art input, that is, the rotation angle of the bone B is adjusted according to an inputted rotation coefficient, and the adjusted rotation is superimposed onto rotation already performed, that is, superimposed onto a current rotation angle of the bone B, to complete rotation of the bone B. A rotation angle of the bone C is calculated, rotation is then adjusted according to a fine art input, that is, the rotation angle of the bone C is adjusted according to an inputted rotation coefficient, and the adjusted rotation is superimposed onto rotation already performed, that is, superimposed onto a current rotation angle of the bone C, to complete rotation of the bone C.

Although calculation of rotation of the bone A, the bone B, and the bone C is shown separately in FIG. 5, in one embodiment, the rotation angles of the bone A and the bone B may be directly obtained according to their corresponding rotation coefficients after the rotation angle (e.g., target angle) of the bone C is calculated, to complete hierarchical rotation from the bone A to the bone C, and a final rotation result may refer to FIG. 4. In FIG. 4, an angle between eyes of a character (equivalent to the bone C) and the X-axis is reduced by 30°, and an angle between a head (equivalent to the bone A) and the X-axis and an angle between a neck (equivalent to the bone B) and the X-axis are reduced by 20° and 10° respectively.

In one embodiment, the effect of eyeballs tracking the camera may be generated in real time, the animation is smooth and natural with no artifact, and another animation of the body is not affected, for example, an animation of blinking (i.e., the other animation) is not affected while turning the head to look at you (e.g., the disclosed method for generating animation of eyeballs tracking camera). As described above, the technical solution of the present disclosure is a solution for adjusting a part (that is, a to-be-adjusted target) of a target object in a virtual scene to face toward a virtual camera. The virtual scene may be one of the foregoing game scene or the social scene.

In some embodiments, the implementation details (e.g., specific steps of calculating the proper target angle) are transparent to the animation art designer. The animation art designer only need to enter parameters such as the ratio of the rotation angles of the hierarchical objects (e.g., the ratio of rotation angles of the neck, the head, and the eye), and/or rotation speed, the animation effect can be rendered and presented. The animation art designer can further adjust the parameters to achieve a desired outcome.

For ease of description, the foregoing method embodiments are stated as a combination of a series of actions. However, a person skilled in the art is to know that the present disclosure is not limited by the described action sequence, because according to the present disclosure, some steps may be performed in another sequence or simultaneously. In addition, a person skilled in the art is further to understand that the embodiments described in this specification are all exemplary embodiments, and the involved actions and modules are not necessarily required by the present disclosure.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of the present disclosure essentially or the part contributing to the existing technologies may be implemented in the form of a software product. The computer software product is stored in a storage medium (for example, a read-only memory (ROM)/random access memory (RAM), a magnetic disk, or an optical disc), and includes several instructions for instructing a terminal device (which may be a mobile phone, a computer, a server, a network device, or the like) to perform the method described in the embodiments of the present disclosure.

Figure 6:
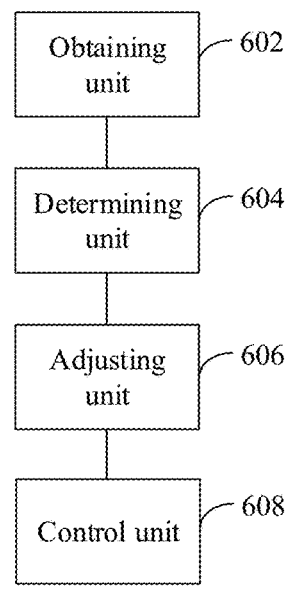
FIG. 6 is a schematic diagram of an exemplary animation control apparatus according to an embodiment of the present disclosure.

According to another aspect of the embodiments of the present disclosure, an animation control apparatus configured to implement the foregoing animation control method is further provided. FIG. 6 is a schematic diagram of an exemplary animation control apparatus according to an embodiment of the present disclosure. As shown in FIG. 6, the apparatus may include:

an obtaining unit 602, configured to obtain a first position of a virtual camera in an animation and a second position of a to-be-adjusted target in the animation;

a determining unit 604, configured to determine a rotation angle for the to-be-adjusted target according to the first position, the second position, and coordinate information of a target object to which the to-be-adjusted target belongs;

an adjusting unit 606, configured to adjust the rotation angle by using a rotation coefficient to obtain a target angle, the rotation coefficient being used for adjusting a ratio of the rotation angle of the to-be-adjusted target to that of an associated target, and the associated target being a target with a linkage relationship with the to-be-adjusted target; and a control unit 608, configured to control the to-be-adjusted target to rotate according to the target angle, so that the rotated to-be-adjusted target faces toward the virtual camera.

In the embodiments, according to positions of a to-be-adjusted target and a virtual camera, a matrix expression of coordinates of the to-be-adjusted target is determined. A rotation angle for the to-be-adjusted target is then determined according to the coordinates of the to-be-adjusted target. The rotation angle may be adjusted according to an inputted rotation coefficient to obtain a target angle. Next the to-be-adjusted target is controlled to adjust according to the target angle, to make the rotation of the to-be-adjusted target more flexible and the expressed effect more natural, thereby resolving the technical problem of inflexibility of rotation angle adjustment in the related art.

Optionally, the determining unit 604 includes:

a first obtaining module, configured to obtain a first matrix of the to-be-adjusted target according to a vector heading from the second position to the first position;

a second obtaining module, configured to obtain a rotation matrix of the target object as a second matrix, the second matrix being used to control rotation of the target object in a preset scene;

a third obtaining module, configured to obtain a rotation matrix of the target object in an initial state as a third matrix;

a multiplying unit, configured to multiply the first matrix, an inverse matrix of the second matrix, and the third matrix sequentially to obtain a target matrix; and a conversion unit, configured to convert the target matrix into the rotation angle.

Optionally, the control unit 608 includes: a fourth obtaining module, configured to obtain a current rotation matrix of the to-be-adjusted target; a first application module, configured to apply the target angle to the current rotation matrix to obtain a target matrix, a rotation angle represented by the target matrix being an angle at which the to-be-adjusted target faces toward the virtual camera; and a rotation module, configured to control the to-be-adjusted target to rotate to the target matrix.

Optionally, the apparatus further includes: a setting unit, configured to set a time required for rotation of the to-be-adjusted target to obtain rotation time; and an interpolation unit, configured to perform linear interpolation on the rotation angle according to the rotation time to obtain an interpolated rotation angle, the target angle being obtained by multiplying the interpolated rotation angle by the rotation coefficient; and the adjusting unit 606 is specifically configured to adjust the interpolated rotation angle by using the rotation coefficient to obtain the target angle.

Optionally, the control unit 608 includes: a fifth obtaining module, configured to obtain a rotation coefficient of at least one of the associated targets to obtain at least one rotation coefficient; a second application module, configured to apply the at least one rotation coefficient to a corresponding associated target among the associated targets to obtain at least one rotation angle; and a control module, configured to control the at least one associated target and the to-be-adjusted target to rotate hierarchically according to the target angle and the at least one rotation angle.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

For technical details of the animation control apparatus provided in the embodiments of the present disclosure, reference is made to the foregoing method embodiments. For briefness, details are not described herein again.

Figure 7:
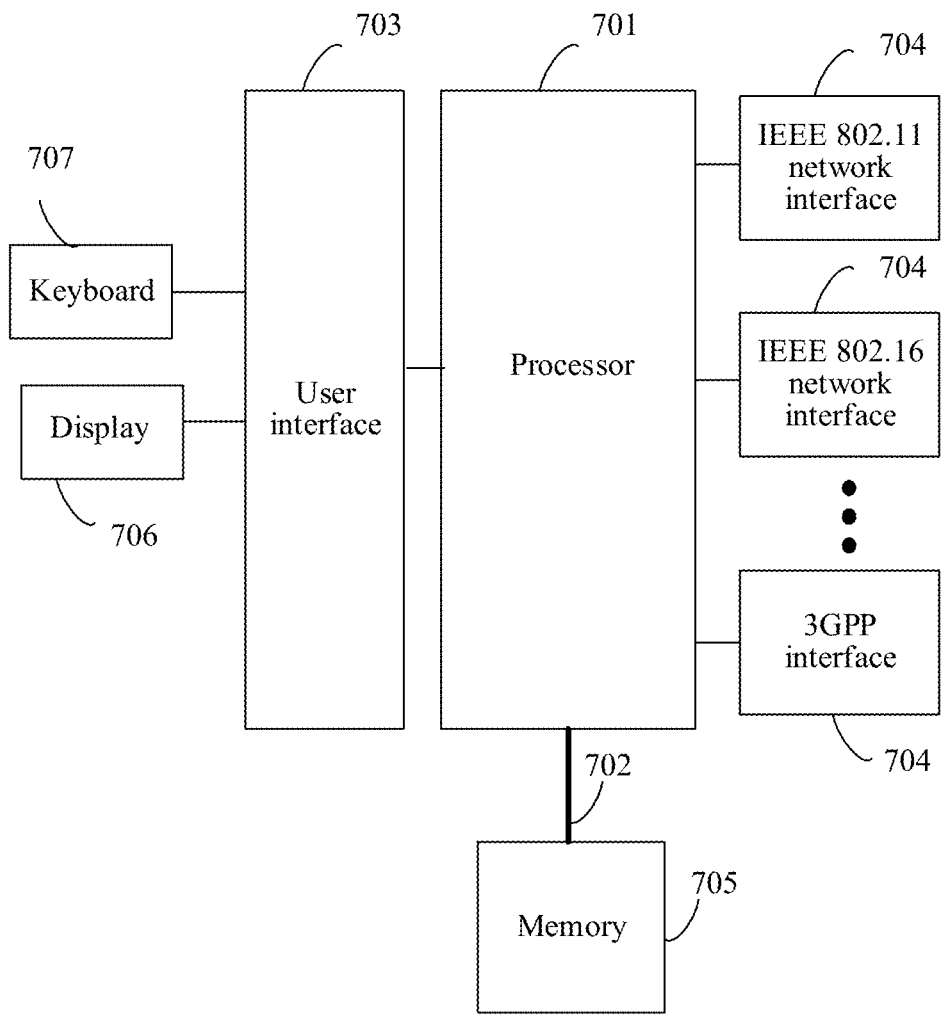
FIG. 7 is a schematic diagram of an exemplary electronic device according to an embodiment of the present disclosure.

According to still another aspect of the embodiments of the present disclosure, an electronic device configured to implement the foregoing animation control method is further provided. As shown in FIG. 7, the electronic device includes a memory and a processor, the memory storing a computer program, and the processor being configured to perform steps in any one of the foregoing method embodiments by using the computer program.

The electronic device may be a terminal or a server, which is not specifically limited in the embodiments of the present disclosure.

FIG. 7 is a schematic diagram of an exemplary electronic device according to an embodiment of the present disclosure. As shown in FIG. 7, the electronic device may include: one or more (only one processor is shown in FIG. 7) processors 701, at least one communication bus 702, a user interface 703, at least one transmission apparatus 704, and a memory 705. The communication bus 702 is configured to implement connection communication between the components. The user interface 703 may include a display 706 and a keyboard 707. The transmission apparatus 704 may optionally include a standard wired interface and wireless interface.

Optionally, in one embodiment, the electronic device may be located in at least one of a plurality of network devices of a computer network.

Optionally, in one embodiment, the processor may be configured to perform the following steps through a computer program:

obtaining a first position of a virtual camera in an animation and a second position of a to-be-adjusted target in the animation;

determining a rotation angle for the to-be-adjusted target according to the first position, the second position, and coordinate information of a target object to which the to-be-adjusted target belongs;

inputting a rotation coefficient and adjusting the rotation angle, to obtain a target angle; and controlling the to-be-adjusted target to rotate according to the target angle.

Optionally, a person of ordinary skill in the art may understand that, the structure shown in FIG. 7 is only illustrative. The electronic device may alternatively be a terminal device such as a smartphone (for example, an Android mobile phone or an iOS mobile phone), a tablet computer, a palmtop computer, a mobile Internet device (MID), or a PAD. FIG. 7 does not limit the structure of the electronic device. For example, the electronic device may alternatively include more or fewer components (such as a network interface and a display apparatus) than those shown in FIG. 7, or have configurations different from that shown in FIG. 7.

The memory 705 may be configured to store a software program and a module, for example, a program instruction/module corresponding to the apparatus in the embodiments of the present disclosure, and the processor 701 performs various functional applications and data processing by running the software program and the module stored in the memory 705, that is, implementing the foregoing any implementation of the animation control method provided above. The memory 705 may include a high-speed RAM, and may further include a non-volatile memory such as one or more magnetic storage apparatuses, a flash memory, or another non-volatile solid-state memory. In some embodiments, the memory 705 may further include memories remotely disposed relative to the processor 701, and these remote memories may be connected to the terminal through a network. Examples of the network include, but are not limited to, the Internet, an intranet, a local area network, a mobile communication network, and a combination thereof.

The transmission apparatus 704 is configured to receive or transmit data through a network. Specific examples of the network may include a wired network and a wireless network. In an example, the transmission apparatus 704 includes a network interface controller (NIC), and the NIC may be connected to another network device and a router via a network cable to communicate with the Internet or a local area network. In an example, the transmission apparatus 704 is a radio frequency (RF) module, configured to communicate with the Internet in a wireless manner.

Specifically, the memory 705 is configured to store the rotation matrices of the to-be-adjusted target.

In one embodiment, according to positions of a to-be-adjusted target and a virtual camera, a matrix expression of coordinates of the to-be-adjusted target is determined. A rotation angle for the to-be-adjusted target is determined according to the coordinates of the to-be-adjusted target. The rotation angle may be adjusted according to a rotation coefficient to obtain a target angle. The to-be-adjusted target is then controlled to adjust according to the target angle, to make the rotation of the to-be-adjusted target more flexible and the expressed effect more natural, thereby resolving the technical problem of inflexibility of rotation angle adjustment in the related art.

The embodiments of the present disclosure further provide a storage medium, storing a computer program, the computer program being configured to perform any implementation of the foregoing animation control method when run.

Optionally, in one embodiment, the storage medium may be configured to store a computer program for performing the following steps:

obtaining a first position of a virtual camera in an animation and a second position of a to-be-adjusted target in the animation;

determining a rotation angle for the to-be-adjusted target according to the first position, the second position, and coordinate information of a target object to which the to-be-adjusted target belongs;

inputting a rotation coefficient and adjusting the rotation angle, to obtain a target angle; and controlling the to-be-adjusted target to rotate according to the target angle.

Optionally, the storage medium is further configured to store a computer program used for performing the steps included in the animation control method according to the foregoing embodiments, and details are not described in this embodiment.

Optionally, in one embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

Optionally, the embodiments of the present disclosure further provide a computer program product including instructions, the instructions, when run on a computer, causing the computer to perform the method according to the foregoing embodiments.

In response to that the integrated unit in the foregoing embodiments is implemented in the form of a software functional unit and sold or used as an independent product, the integrated unit may be stored in the foregoing computer-readable storage medium. Based on such an understanding, the technical solutions of the present disclosure essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of the present disclosure.

In the foregoing embodiments of the present disclosure, descriptions of the embodiments have respective focuses. As for parts that are not described in detail in one embodiment, reference may be made to the relevant descriptions of the other embodiments.

In the several embodiments provided in the present disclosure, it is to be understood that the disclosed client may be implemented in other manners. The described apparatus embodiment is merely an example. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and the parts displayed as units may or may not be physical units, may be located in one place, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of the present disclosure. A person of ordinary skill in the art may further make several improvements and modifications without departing from the principle of the present disclosure, and the improvements and modifications fall within the protection scope of the present disclosure.

What is claimed is:

1. An animation control method, applicable to an electronic device, the method comprising:
obtaining a first position of a virtual camera in an animation and a second position of a to-be-adjusted target in the animation;
obtaining a first matrix of the to-be-adjusted target according to a vector heading from the second position to the first position;
obtaining a rotation matrix of a target object to which the to-be-adjusted target belongs as a second matrix, the second matrix being used to control rotation of the target object;
obtaining a rotation matrix of the target object in an initial state as a third matrix;
determining a first rotation angle for the to-be-adjusted target according to the first matrix, the second matrix, and the third matrix;
adjusting the first rotation angle by using a rotation coefficient to obtain a target angle, the rotation coefficient being used for adjusting a ratio of the first rotation angle of the to-be-adjusted target to a second rotation angle of an associated target, and the associated target having a linkage relationship with the to-be-adjusted target; and
controlling the to-be-adjusted target to rotate according to the target angle, so that the rotated to-be-adjusted target faces toward the virtual camera.

2. The method according to claim 1, wherein the determining a first rotation angle for the to-be-adjusted target according to the first matrix, the second matrix, and the third matrix comprises:
multiplying the first matrix, an inverse matrix of the second matrix, and the third matrix sequentially to obtain a target matrix; and
converting the target matrix into the first rotation angle.

3. The method according to claim 1, wherein the controlling the to-be-adjusted target to rotate according to the target angle comprises:
obtaining a current rotation matrix of the to-be-adjusted target;
applying the target angle to the current rotation matrix to obtain a target matrix, a rotation angle represented by the target matrix being an angle at which the to-be-adjusted target faces toward the virtual camera; and
controlling the to-be-adjusted target to rotate to the target matrix.

4. The method according to claim 1, wherein the method further comprises:
setting a time required for rotation of the to-be-adjusted target as a rotation time; and
performing linear interpolation on the first rotation angle according to the rotation time to obtain an interpolated rotation angle, the target angle being obtained by multiplying the interpolated rotation angle by the rotation coefficient; and
the adjusting the first rotation angle by using a rotation coefficient to obtain a target angle comprises:
adjusting the interpolated rotation angle by using the rotation coefficient to obtain the target angle.

5. The method according to claim 1, wherein the controlling the to-be-adjusted target to rotate according to the target angle comprises:
obtaining a rotation coefficient of at least one associated target as at least one rotation coefficient;
applying the at least one rotation coefficient to a corresponding associated target among the at least one associated target to obtain at least one rotation angle; and
controlling the at least one associated target and the to-be-adjusted target to rotate in a hierarchical order according to the target angle and the at least one rotation angle.

6. The method according to claim 5, wherein:
the to-be-adjusted target is an eye of the target object;
the at least one associated target includes a neck and a head of the target object;
the hierarchical order is the neck, the head, the eye; and
the rotation angles of the neck and the head is directly obtained according to the corresponding rotation coefficients and the target angle of the to-be-adjusted target.

7. The method according to claim 1, wherein:
the to-be-adjusted target includes one or more eyes of the target object; and
the associated target includes at least one of a neck of the target object or a head of the target object.

8. An animation control apparatus, comprising: a memory and a processor, the memory storing a computer program, and the processor being configured to perform, when executing the computer program, a plurality of operations comprising:
obtaining a first position of a virtual camera in an animation and a second position of a to-be-adjusted target in the animation;
obtaining a first matrix of the to-be-adjusted target according to a vector heading from the second position to the first position;
obtaining a rotation matrix of a target object to which the to-be-adjusted target belongs as a second matrix, the second matrix being used to control rotation of the target object;
obtaining a rotation matrix of the target object in an initial state as a third matrix;
determining a first rotation angle for the to-be-adjusted target according to the first matrix, the second matrix, and the third matrix adjusting the first rotation angle by using a rotation coefficient to obtain a target angle, the rotation coefficient being used for adjusting a ratio of the first rotation angle of the to-be-adjusted target to a second rotation angle of an associated target, and the associated target having a linkage relationship with the to-be-adjusted target; and controlling the to-be-adjusted target to rotate according to the target angle, so that the rotated to-be-adjusted target faces toward the virtual camera.

9. The apparatus according to claim 8, wherein determining the first rotation angle for the to-be-adjusted target comprises:
multiplying the first matrix, an inverse matrix of the second matrix, and the third matrix sequentially to obtain a target matrix; and
converting the target matrix into the first rotation angle.

10. The apparatus according to claim 8, wherein controlling the to-be-adjusted target to rotate comprises:
obtaining a current rotation matrix of the to-be-adjusted target;

applying the target angle to the current rotation matrix to obtain a target matrix, a rotation angle represented by the target matrix being an angle at which the to-be-adjusted target faces toward the virtual camera; and
controlling the to-be-adjusted target to rotate to the target matrix.

11. The apparatus according to claim 8, wherein the plurality of operations further comprises:
setting a time required for rotation of the to-be-adjusted target as a rotation time; and
performing linear interpolation on the first rotation angle according to the rotation time to obtain an interpolated rotation angle, the target angle being obtained by multiplying the interpolated rotation angle by the rotation coefficient; and
adjusting the interpolated rotation angle by using the rotation coefficient to obtain the target angle.

12. The apparatus according to claim 8, wherein the plurality of operations further comprises:
obtaining a rotation coefficient of at least one associated target as at least one rotation coefficient;
applying the at least one rotation coefficient to a corresponding associated target among the associated targets to obtain at least one rotation angle; and
controlling the at least one at least one associated target and the to-be-adjusted target to rotate in a hierarchical order according to the target angle and the at least one rotation angle.

13. The apparatus according to claim 12, wherein:
the to-be-adjusted target is an eye of the target object;
the at least one associated target includes a neck and a head of the target object;
the hierarchical order is the neck, the head, the eye; and
the rotation angles of the neck and the head is directly obtained according to the corresponding rotation coefficients and the target angle of the to-be-adjusted target.

14. The apparatus according to claim 8, wherein:
the to-be-adjusted target includes one or more eyes of the target object; and
the associated target includes at least one of a neck of the target object or a head of the target object.

15. A non-transitory storage medium, storing a computer program, and the computer program, when being executed by a processor, causing the processor to perform a plurality of operations comprising:
obtaining a first position of a virtual camera in an animation and a second position of a to-be-adjusted target in the animation;
obtaining a first matrix of the to-be-adjusted target according to a vector heading from the second position to the first position;
obtaining a rotation matrix of a target object to which the to-be-adjusted target belongs as a second matrix, the second matrix being used to control rotation of the target object;
obtaining a rotation matrix of the target object in an initial state as a third matrix;
determining a first rotation angle for the to-be-adjusted target according to the first matrix, the second matrix, and the third matrix;

adjusting the first rotation angle by using a rotation coefficient to obtain a target angle, the rotation coefficient being used for adjusting a ratio of the first rotation angle of the to-be-adjusted target to a second rotation angle of an associated target, and the associated target having a linkage relationship with the to-be-adjusted target; and
controlling the to-be-adjusted target to rotate according to the target angle, so that the rotated to-be-adjusted target faces toward the virtual camera.

16. The storage medium according to claim 15, wherein determining the first rotation angle for the to-be-adjusted target comprises:
multiplying the first matrix, an inverse matrix of the second matrix, and the third matrix sequentially to obtain a target matrix; and
converting the target matrix into the first rotation angle.

17. The storage medium according to claim 15, wherein controlling the to-be-adjusted target to rotate comprises:
obtaining a current rotation matrix of the to-be-adjusted target;
applying the target angle to the current rotation matrix to obtain a target matrix, a rotation angle represented by the target matrix being an angle at which the to-be-adjusted target faces toward the virtual camera; and
controlling the to-be-adjusted target to rotate to the target matrix.

18. The storage medium according to claim 15, wherein the plurality of operations further comprises:
setting a time required for rotation of the to-be-adjusted target as a rotation time; and
performing linear interpolation on the first rotation angle according to the rotation time to obtain an interpolated rotation angle, the target angle being obtained by multiplying the interpolated rotation angle by the rotation coefficient; and
adjusting the interpolated rotation angle by using the rotation coefficient to obtain the target angle.

19. The storage medium according to claim 15, wherein the plurality of operations further comprises:
obtaining a rotation coefficient of at least one associated target as at least one rotation coefficient;
applying the at least one rotation coefficient to a corresponding associated target among the associated targets to obtain at least one rotation angle; and
controlling the at least one at least one associated target and the to-be-adjusted target to rotate in a hierarchical order according to the target angle and the at least one rotation angle.

20. The storage medium according to claim 19, wherein:
the to-be-adjusted target is an eye of the target object;
the at least one associated target includes a neck and a head of the target object;
the hierarchical order is the neck, the head, the eye; and
the rotation angles of the neck and the head is directly obtained according to the corresponding rotation coefficients and the target angle of the to-be-adjusted target.

* * * * *